Dec. 25, 1956 W. F. ALLER 2,775,117
PNEUMATIC GAUGING DEVICE
Filed Oct. 15, 1952
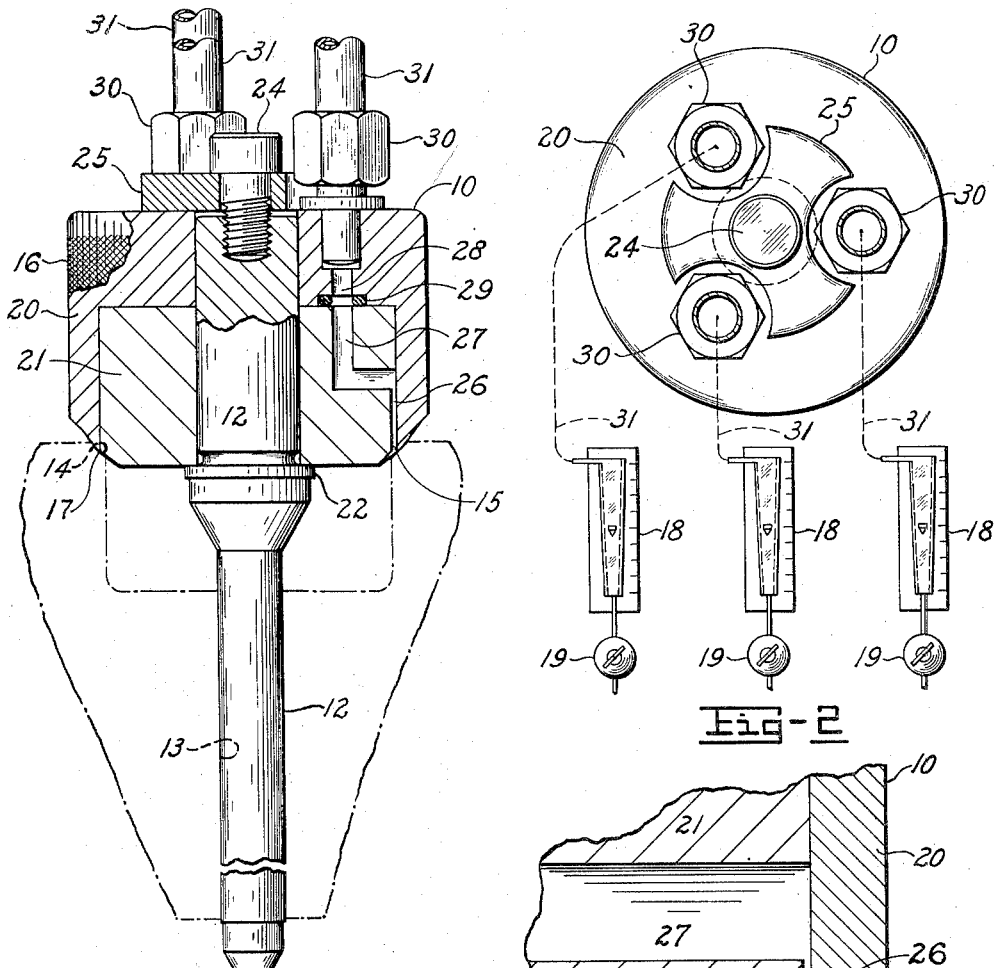
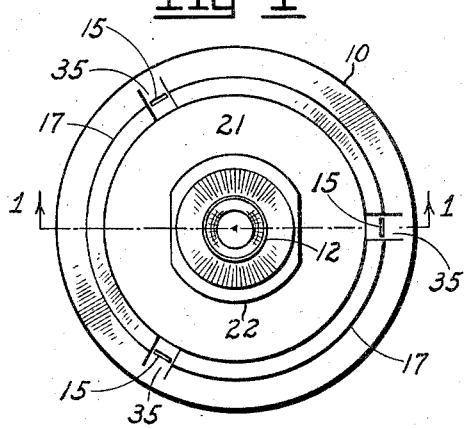
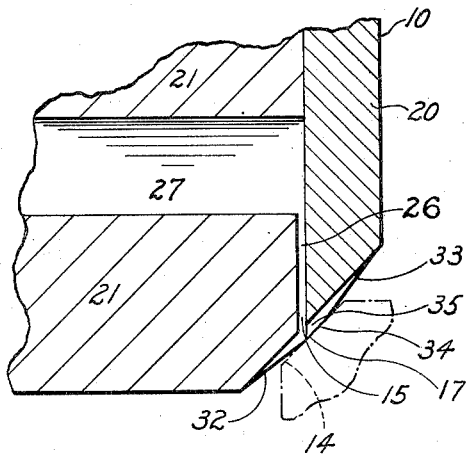
INVENTOR.
W. F. Aller
BY Edward J. [signature]
atty.

2,775,117
PNEUMATIC GAUGING DEVICE

Willis Fay Aller, Dayton, Ohio, assignor to The Sheffield Corporation, Dayton, Ohio, a corporation of Ohio Application October 15, 1952, Serial No. 314,796

7 Claims. (Cl. 73—37.8)

This invention relates to gauges, and more particularly to a device for measuring the relative disposition of two surfaces.

One object of this invention is to provide a gauging head, for use in conjunction with flow measuring instruments, which is provided with means for locating the head with respect to one of two surfaces and which supports fluid leakage nozzles so arranged with respect to the other of said surfaces that a comparison of the flows through the nozzles will indicate the relative disposition of the said two surfaces.

Another object of this invention is to provide a gauging head of the character mentioned wherein a projecting pilot element and a body portion containing fluid leakage nozzles are arranged in axial alignment, the body portion being formed of inner and outer cylindrical elements with axial grooves in one of their mating surfaces providing individual nozzle outlets and at least a portion of their associated passages.

Another object is to provide a gauging head for rapidly and accurately checking the relative axial relationship of a valve guide hole and a valve seat or the like.

Other objects and advantages of the invention will be apparent from the following description, the appended claims and the accompanying drawings, in which, Fig. 1 illustrates a gauging head partially in section, taken on line 1—1 of Fig. 3, situated with respect to surfaces, the relative disposition of which is to be measured;

Fig. 2 is a view of the upper end of the gauging head;

Fig. 3 is a view looking at the lower end of the gauging head; and

Fig. 4 is a sectional view in detail of the nozzle outlet, the abutting means and associated passages.

Referring more particularly to the drawing, gauging head 10 is provided, adapted for connection to an air supply and air gauging devices and having provision for locating the head with respect to one surface of an object so that the relationship of that surface can be determined with respect to another surface of the object by measuring or comparing the flow taking place through a series of leakage orifices arranged adjacent the surface to be gauged or compared.

While the gauge head 10 may be constructed for various applications or uses, as herein illustrated for purposes of example, the gauging head 10 is shown as located by a pilot spindle 12, forming a part thereof, in telescopic engagement with a valve guide hole 13 of an engine for checking the concentricity of that hole with respect to a valve seat 14. The projecting pilot spindle 12 locates the gauging head 10 in concentric relation to the valve guide hole 13. Individual leakage nozzles 15 in a body portion 16 are disposed at equal radii with respect to the pilot spindle 12 and in close proximity to the valve seat 14 but are prevented from coming in actual contact therewith by abutment means 17. Escape of air under pressure from each of the nozzles 15 will accordingly be controlled by its spacing with respect to the adjacent portion of the valve seat 14. The escape flow through each of the leakage nozzles 15 is indicated on an individual measuring instrument 18 one of which is connected to each of these nozzles. Air under pressure is supplied through the pressure regulating valves 19. Accordingly, with the gauging head situated concentrically with respect to the valve guide hole, a comparison of the leakage gauge readings will result in an indication of the relative alignment of the two parts. If the leakage gauge readings are equal the leakage through each of the nozzles is the same and the two parts are concentrically disposed. A relative eccentricity between the parts will be indicated by a difference between the gauge readings.

The gauging head 10 is preferably composed of two major components, an inner pilot spindle 12 and a body portion 16. The body portion 16 includes an outer cylindrical element 20 and an inner element 21. The elements 20 and 21 are arranged coaxially along the inner portion of the spindle 12 and the innermost element 21 abuts against a land 22 provided on the spindle 12. These elements are retained in coaxial arrangement by a screw 24 threaded into the upper end of the spindle 12. Between the screw 24 and the spindle element 12 is a retaining element 25 cooperating with outer cylindrical element 20.

Noting in particular Fig. 4, the nozzle outlets 15 and a portion of their communicating passages 26 are formed by axial grooves in the lower portion, as here illustrated, of the innermost cylindrical element 21. Each of these passages 26 communicates with a passage 27 in the inner component 21 leading to a connection with a corresponding passage 28 in the outer cylindrical element 20 sealed by a rubber O-ring 29 and through an outlet coupling 30 to a flexible tube 31.

The relative disposition of the coupling elements 30 and the retaining element 25 is more clearly shown in Figure 2. That figure also shows diagrammatically the connections from the coupling elements 30 through the flexible conduits 31 to the individual flow measuring instruments shown at 18. These instruments are of the general character, for example, as disclosed in U. S. Letters Patent 2,254,259, granted September 2, 1941. Fig. 3 shows the disposition of the outlet nozzles 15 at equal radii about the axis of the pilot spindle 12.

Referring again to the detail section of Fig. 4, therein is shown the differential chamfering at 32, 33 and 34 of the lower edges of the inner and outer cylindrical elements 20 and 21 resulting in a narrow land. Across this land and mated with each of the outlet nozzles is a groove 35. These grooves 35 are also shown in Fig. 3. The differential chamfering about the lower end of the gauge head body and the grooves across the nozzle opening form projecting abutments between the nozzles 15 for sustaining the nozzle openings away from the piece with respect to which measurements are being taken, thereby allowing air leakage at all times.

The character of this gauging device is such that accurate indications of the relative disposition of two surfaces in a common part can be readily obtained by a single application of the gauging head and without the necessity of rotation or other movement of the gauging head relative to the surfaces being measured once it has been applied. Also in the embodiment described the device is simple and rugged in construction.

While the form of the apparatus herein disclosed constitutes the preferred embodiment of the invention it is to be understood that the invention is not limited by this illustrated and described embodiment but that changes may be made therefrom without departing from the scope of the invention as defined in the appended claims.

I claim:

1. A gauging head for checking the relative alignment of two substantially concentric and axially displaced surfaces of revolution comprising a pilot element for telescopic engagement with the one of said two surfaces chosen as a reference to definitely locate the axis of the pilot element to coincide with the axis of said one surface, a radially enlarged body supported by said pilot element having a plurality of fluid leakage gauging means equally spaced at equal radii about the center line of said body in a common radial plane gauging association with spaced points on the other of the said two surfaces for control of the flow therethrough, and individual passage means for independently connecting each of said gauging means to a separate gauge and an air supply.

2. A gauging head for checking the relative alignment, in a part, of a substantially conical surface and a cylindrical surface, said surfaces being substantially axially aligned, said head comprising a projecting pilot element for telescopic engagement with said cylindrical surface to accurately center the head concentrically with respect thereto and a body unit supported by said pilot projection having a plurality of fluid leakage nozzles therein equally spaced at equal radii about the longitudinal axis of the pilot projection in a common radial plane for positioning in close proximity to the conical surface, the relative proximity of each of said nozzles to the adjacent portion of the conical surface controlling the flow therethrough, abutment means forming a part of said body unit for preventing actual contact of said nozzles with the conical surface, and individual passage means for independently connecting each of said nozzles to a separate gauge and an air supply.

3. A gauging head for checking the axial alignment of a valve guide hole and a valve seat, said head comprising a projecting pilot spindle for telescopic insertion into the valve guide hole to accurately center the gauging head along the axis of said guide hole, and a body portion coaxially attached to said spindle and containing a plurality of fluid leakage nozzles equally spaced and at equal radii about the center line of said spindle in a common radial plane, abutment projections forming a part of said body portion for preventing engagement of the nozzles with the valve seat but supporting said nozzles in flow control relationship with the said seat, and individual passage means for independently connecting each of said nozzles to a separate gauge and an air supply.

4. A gauging head for checking the relative alignment of two substantially concentric surfaces of revolution comprising a pilot spindle projection and a body portion attached coaxially to the upper end thereof, said body portion being formed of an outer cylindrical member having a cylindrical depression in the lower end face thereof, an inner cylindrical member seated in said depression, axially disposed grooves equally around the lower portion of the mating wall of one of said members, cooperating with the wall portion of the other member to form passages and fluid leakage nozzles about the axis of said body portion at its lower end, said outer and inner members being chamfered at differing angles intersecting approximately at their adjoining line, said two members having grooves angled across their chamfered surfaces at each of the nozzle openings to form escape passages therefrom and means for connecting each of said passages to an individual gauge and an air supply.

5. A gauging head for checking the relative alignment of two substantially concentric surfaces of revolution comprising a pilot spindle projection and a body portion attached coaxially to the upper end thereof, said body portion being formed of an outer cylindrical member having a cylindrical depression in the lower face thereof, an inner cylindrical member seated in said depression, axially disposed grooves equally spaced around the lower portion of the mating wall of one of said members, said grooves having a transverse section elongated in a circumferential direction but restricted in radial depth and cooperating with the wall portion of the other member to form passages and fluid leakage nozzles about the axis of said body portion at its lower end, said outer and inner members being chamfered at differing angles intersecting approximately at their adjoining line, said two members having grooves angled across their chamfered surfaces at each of the nozzle openings to form escape passages therefrom and means for connecting each of said passages to an individual gauge and an air supply.

6. A gauging head for checking the axial alignment of a valve guide hole and a valve seat, said head comprising an extended pilot element for insertion into the valve guide hole to center the gauging head relative thereto, a radially larger body coaxially supported adjacent the other end of the pilot element, a tapered surface at one end of said body for location along the valve seat, said body having air leakage gauging means equally spaced about the axis of the body and along the tapered surface for gauging association with spaced points on the valve seat, independent passages in said body leading from each of the air leakage gauging means to the other end of the body, and means for connecting each of said passages to an individual air gauge and an air supply whereby an instantaneous indication of the gauged relationship is obtained.

7. A gauging head for checking the axial alignment of a valve guide hole and a valve seat, comprising an extended pilot element for insertion into the valve guide hole to center the head relative thereto, a substantially annular body supported adjacent one end of said pilot element, the transverse dimension of said body being greater than the diameter of the valve seat portion being gauged, a tapered surface at one end of said body for location along the valve seat, said body having a plurality of air leakage gauging means equally spaced about the axis of said body and along the tapered surface for gauging association with spaced points on the valve seat, independent passages in said body leading from each of the air leakage gauging means to the other end of the body, and means for connecting each of said passages to an individual air gauge and an air supply whereby an instantaneous indication of the gauged relationship is obtained.

References Cited in the file of this patent

UNITED STATES PATENTS

| | | |
|---|---|---|
| 1,437,053 | Harrington | Nov. 28, 1922 |
| 2,254,259 | Aller | Sept. 2, 1941 |
| 2,408,672 | Mennesson | Oct. 1, 1946 |
| 2,446,071 | Aller | July 27, 1948 |
| 2,465,002 | Aller | Mar. 22, 1949 |
| 2,490,376 | Rupley | Dec. 6, 1949 |
| 2,497,236 | Polk | Feb. 14, 1950 |
| 2,572,368 | Minix | Oct. 23, 1951 |
| 2,594,046 | Mahlmeister | Apr. 22, 1952 |
| 2,623,294 | Fox | Dec. 30, 1952 |
| 2,712,181 | Mahlmeister | July 5, 1955 |

FOREIGN PATENTS

| | | |
|---|---|---|
| 961,817 | France | Nov. 28, 1949 |
| 658,754 | Great Britain | Oct. 10, 1951 |